United States Patent
Sambhwani et al.

(10) Patent No.: US 12,476,693 B2
(45) Date of Patent: Nov. 18, 2025

(54) COMMUNICATION VIA UPLINK AND DOWNLINK REFLECTIVE DEVICES

(71) Applicant: Apple Inc., Cupertino, CA (US)

(72) Inventors: Sharad Sambhwani, San Diego, CA (US); Boqiang Fan, San Diego, CA (US); Ankit Bhamri, Bad Nauheim (DE); Mithat C Dogan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 18/157,682

(22) Filed: Jan. 20, 2023

(65) Prior Publication Data

US 2024/0250741 A1 Jul. 25, 2024

(51) Int. Cl.
*H04B 7/145* (2006.01)
*H04B 7/0426* (2017.01)

(52) U.S. Cl.
CPC ............. *H04B 7/145* (2013.01); *H04B 7/043* (2013.01)

(58) Field of Classification Search
CPC ..... H04B 7/145; H04B 7/043; H04B 7/04013
USPC .......................................................... 455/25
See application file for complete search history.

(56) References Cited

U.S. PATENT DOCUMENTS

| | | | |
|---|---|---|---|
| 2017/0054216 A1 | 2/2017 | Shi et al. | |
| 2020/0052756 A1* | 2/2020 | Raghavan | H04B 7/0695 |
| 2024/0014860 A1* | 1/2024 | Wang | H04B 7/026 |
| 2024/0048307 A1* | 2/2024 | Duan | H04W 64/00 |
| 2024/0250720 A1* | 7/2024 | Shen | H04B 7/0473 |
| 2024/0275432 A1* | 8/2024 | Ly | H04B 7/0617 |
| 2024/0275433 A1* | 8/2024 | Li | H04B 17/391 |
| 2024/0405807 A1* | 12/2024 | Haija | H04B 7/04013 |

OTHER PUBLICATIONS

Qingqing Wu et al., Intelligent Reflecting Surface Aided Wireless Communications: A Tutorial, IEEE Transactions on Communications, Jan. 2021, pp. 1-39, IEEE, New York, NY, United States.

C. Mukherjee et al., First Uni-Traveling Carrier Photodiode Compact Model Enabling Future Terahertz Communication System Design, ESSDERC 2019—49th European Solid-State Device Research Conference (ESSDERC), Sep. 2019, pp. 150-153, IEEE, New York, NY, United States.

(Continued)

*Primary Examiner* — Don N Vo
(74) *Attorney, Agent, or Firm* — Treyz Law Group, P.C.; Michael H. Lyons

(57) ABSTRACT

A communication system may include a base station (BS), user equipment (UE), and a set of reconfigurable intelligent surfaces (RIS's). The RIS's, the UE, and the BS may communicate using a control RAT and a data RAT. The BS may transmit downlink (DL) signals to the UE device via reflection off a DL RIS. The UE device may transmit uplink (UL) signals to the BS via reflection off a UL RIS. This may optimize wireless performance in situations where reflecting the UL and DL signals off the same RIS would limit performance under the current data RAT channel conditions. The BS and the UE device may use channel measurements of the control RAT at the RIS's to select the UL RIS and the DL RIS. This may significantly reduce overhead required to identify the UL and DL RIS's relative to scenarios where exhaustive beam training is used.

20 Claims, 7 Drawing Sheets

(56) References Cited

OTHER PUBLICATIONS

L. Zhang et al., Space-Time-Coding Digital Metasurfaces, 13th International Congress on Artificial Materials for Novel Wave Phenomena—Metamaterials 2019, Sep. 16-Sep. 21, 2019, pp. 128-130, IEEE, New York, NY, United States.

Ming Che et al., Optoelectronic THz-Wave Beam Steering by Arrayed Photomixers With Integrated Antennas, IEEE Photonics Technology Letters, Aug. 15, 2020, pp. 979-982, vol. 32, No. 16, IEEE, New York, NY, United States.

Xiaoshen Song et al., Fully- / Partially-Connected Hybrid Beamforming Architectures for mmWave MU-MIMO, IEEE Transactions on Wireless Communications, pp. 1-16, vol. 19, IEEE, New York, NY, United States.

Cyril C. Renaud et al., Antenna Integrated THz Uni-Traveling Carrier Photodiodes, IEEE Journal of Selected Topics in Quantum Electronics, Mar./Apr. 2018, vol. 24, No. 2, IEEE, New York, NY, United States.

Michele Natrella et al., Accurate equivalent circuit model for millimetre-wave UTC photodiodes, Feb. 25, 2016, vol. 24, No. 5, Optics Express, Washington D.C., United States.

Xilong Pei et al., RIS-Aided Wireless Communications: Prototyping, Adaptive Beamforming, and Indoor/Outdoor Field Trials, IEEE Transactions on Communications, Sep. 29, 2021, pp. 1-13, vol. 69, IEEE, New York, NY, United States.

Chhandak Mukherjee et al., Efficient compact modelling of UTC-photodiode towards terahertz communication system design, Solid-State Electronics, 2020, pp. 1-11, Elsevier, New York, NY, United States.

U.S. Appl. No. 17/827,290, filed May 27, 2022.
U.S. Appl. No. 17/834,695, filed Jun. 7, 2022.
U.S. Appl. No. 17/944,935, filed Sep. 14, 2022.

* cited by examiner

COMMUNICATION VIA UPLINK AND DOWNLINK REFLECTIVE DEVICES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a wireless base station (BS), a user equipment (UE) device, and a set of reconfigurable intelligent surfaces (RIS's). The RIS's, the UE device, and the BS may communicate using a control radio access technology (RAT) and a data RAT. The data RAT may support higher data rates than the control RAT.

The BS may transmit downlink (DL) signals to the UE device via reflection off a DL RIS from the set of RIS's. The BS may form a DL signal beam oriented towards the DL RIS. The UE device may form a DL signal beam oriented towards the DL RIS. The UE device may transmit uplink (UL) signals to the BS via reflection off a UL RIS from the set of RIS's. The BS may form a UL signal beam oriented towards the UL RIS. The UE device may form a UL signal beam oriented towards the UL RIS. The BS and the UE device may perform a RIS selection procedure to select the UL RIS and the DL RIS from the set of RIS's. The UL RIS and the DL RIS may be RIS's that maximize a wireless performance metric such as reference signal received power (RSRP) at the BS and the UE device. This may serve to optimize wireless performance in situations where reflecting the UL signals and the DL signals off the same RIS would limit RSRP under the current radio-frequency propagation conditions of the environment.

The BS and the UE device may use channel measurements of the control RAT to select the UL RIS and the DL RIS. The UE device may use the control RAT to broadcast reference signals to the set of RIS's. The RIS's may perform control RAT measurements on the broadcast reference signals. The RIS's may transmit the control RAT measurements to the BS. The BS may estimate the expected path loss for the data RAT based on the control RAT measurements received from the RIS's. The BS may transmit the estimated path loss, estimated distances/directions between the RIS's and the UE device, and geometry information associated with the RIS's to the UE device. The UE device may calculate first beamforming gains of the UE and potential UL RIS's based on the information received from the BS and may transmit the first beamforming gains to the BS. The BS may generate second beamforming gains of the BS and potential DL RIS's. The BS may select the UL RIS and the DL RIS based on the first and second beamforming gains. The BS may inform the UL RIS and the DL RIS of the selection. The BS or the UL and DL RIS's may inform the UE device of the selection. Selecting the UL and DL RIS's in this way may significantly reduce the overhead required to identify the UL and DL RIS's relative to scenarios where exhaustive beam training is used.

An aspect of the disclosure provides a method of operating a first electronic device to communicate with a second electronic device. The method can include transmitting an uplink signal to the second electronic device via reflection off a first reconfigurable intelligent surface (RIS). The method can include receiving a downlink signal from the second electronic device via reflection off a second RIS that is different from the first RIS.

An aspect of the disclosure provides a method of operating a first electronic device to communicate with a second electronic device. The method can include transmitting a downlink signal to the second electronic device using a first signal beam oriented towards a first reconfigurable intelligent surface (RIS). The method can include receiving an uplink signal from the second electronic device using a second signal beam oriented towards a second RIS that is spatially separated from the first RIS.

An aspect of the disclosure provides a method of operating a first electronic device to communicate with a second electronic device. The method can include receiving channel measurements of a first radio access technology (RAT) from a set of reflective devices. The method can include configuring a first subset of the reflective devices to reflect uplink signals between the first electronic device and the second electronic device using a second RAT that is different form the first RAT. The method can include configuring a second subset of the reflective devices to reflect downlink signals between the first electronic device and the second electronic device using the second RAT, the first subset and the second subset of the reflective devices being selected based on the channel measurements received from the set of reflective devices.

DETAILED DESCRIPTION

Figure 1:
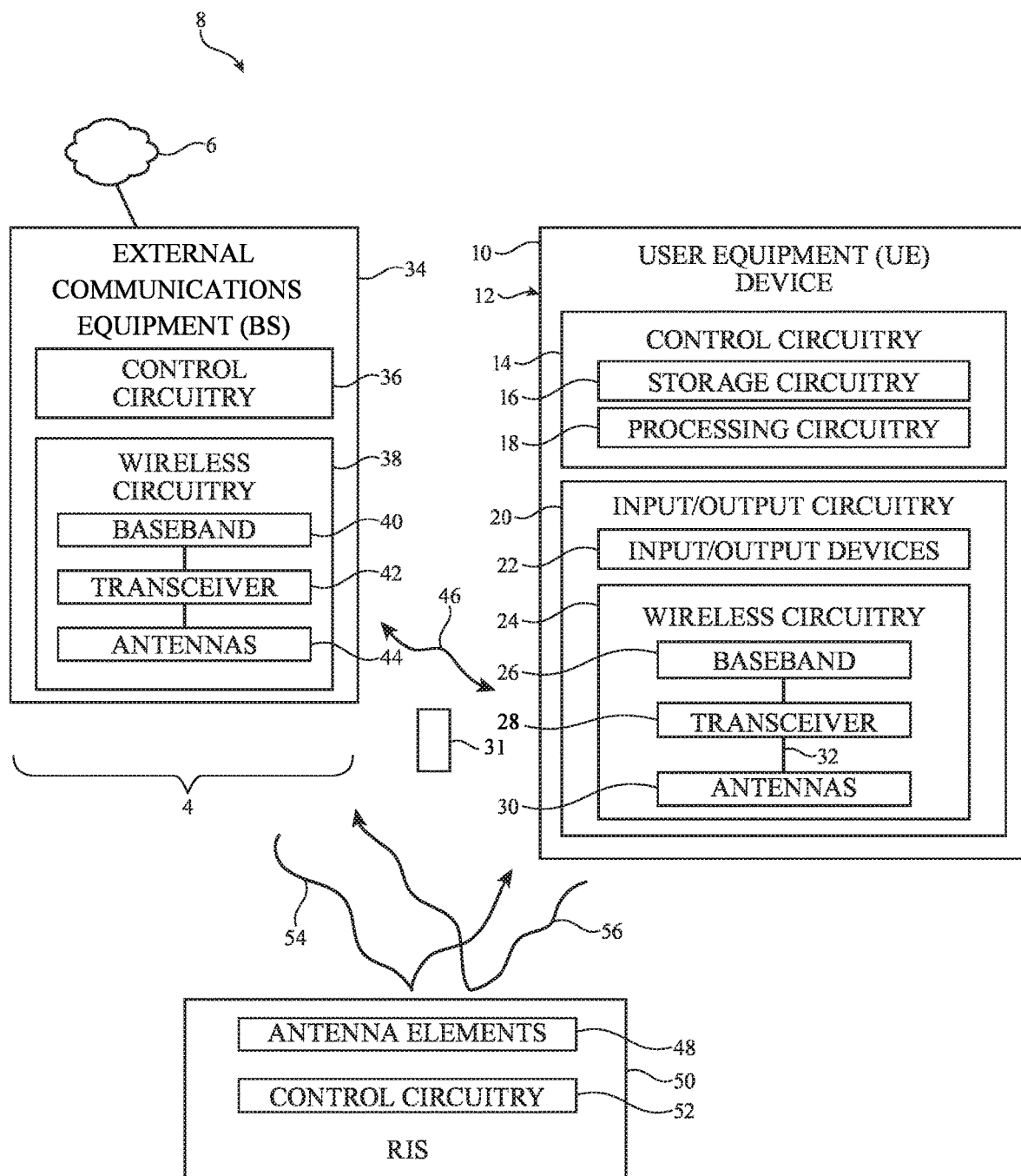
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10 (sometimes referred to herein simply as UE 10). The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless base station (BS) is described herein as an example. External communications equipment 34 may therefore sometimes be referred to herein as BS 34. UE device 10 and BS 34 may communicate with each other using one or more wireless communications links. If desired, UE devices 10 may wirelessly communicate with BS 34 without passing communications through any other intervening network nodes in communications system 8 (e.g., UE devices 10 may communicate directly with BS 34 over-the-air).

BS 34 may be communicably coupled to one or more other network nodes 6 in a larger communications network 4 via wired and/or wireless links. Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via BS 34 (e.g., BS 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.1 lad protocols (e.g., ultrawideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission (e.g., in an uplink (UL) direction from UE device 10 to BS 34), baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception (e.g., in a downlink (DL) direction from BS 34 to UE device 10), antennas 30 may receive radio-frequency signals from BS 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 28 may use antenna(s) 30 to transmit and/or receive wireless signals that convey wireless communications data between device 10 and BS 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4

GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to BS 34 and/or may receive wireless signals 46 from BS 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.).

If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals to another antenna 30 on a second chip in device 10), and/or to perform any other desired high data rate operations.

In implementations where wireless circuitry 24 conveys THF signals, the wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards BS 34 even as the position and orientation of UE device 10 changes. The signal beams formed by antennas 30 of UE device 10 may sometimes be referred to herein as UE beams or UE signal beams. Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, BS 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

BS 34 may use wireless circuitry 38 to transmit a signal beam of wireless signals 46 to UE device 10 (e.g., as DL signals transmitted in a DL direction) and/or to receive a signal beam of wireless signals 46 transmitted by UE device 10 (e.g., as UL signals transmitted in a UL direction). The signal beams formed by antennas 44 of BS 34 may sometimes be referred to herein as BS beams or BS signal beams. Each BS beam may be oriented in a different respective direction (e.g., a beam pointing direction of peak signal gain). Each BS beam may be labeled by a corresponding BS beam index. BS 34 may include or store a codebook (sometimes referred to herein as a BS codebook) that maps each of its BS beam indices to the corresponding phase and magnitude settings for each antenna 44 in a phased antenna array that configure the phased antenna array to form the BS beam associated with that BS beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and BS 34. If an external object is present between BS 34 and UE device 10, the external object may block the LOS between UE device 10 and BS 34, which can disrupt wireless communications using wireless signals 46. If desired, a reflective device such as a reconfigurable intelligent surface (RIS) may be used to allow UE device 10 and BS 34 to continue to communicate using wireless signals 46 even when an external object blocks the LOS between UE device 10 and BS 34 (or whenever direct over-the-air communications between BS 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. BS 34 may be separated from UE device 10 by a line-of-sight (LOS) path. In some circumstances, an external object such as object 31 may block the LOS path. Object 31 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between BS 34 and UE device 10.

In the absence of external object 31, BS 34 may form a corresponding BS beam of wireless signals 46 oriented in the direction of UE device 10 and UE device 10 may form a corresponding UE beam of wireless signals 46 oriented in the direction of BS 34. UE device 10 and BS 34 can then convey wireless signals 46 over their respective signal beams and the LOS path. However, the presence of external object 31 prevents wireless signals 46 from being conveyed over the LOS path.

RIS 50 may be placed or disposed within system 8 in such a way so as to allow RIS 50 to reflect wireless signals 46 between UE device 10 and BS 34 despite the presence of external object 31 within the LOS path. More generally, RIS 50 may be used to reflect wireless signals 46 between UE device 10 and BS 34 when reflection via RIS 50 offers superior radio-frequency propagation conditions relative to the LOS path regardless of the presence of external object 31 (e.g., when the LOS path between BS 34 and RIS 50 and the LOS path between RIS 50 and UE device 10 exhibit superior propagation/channel conditions than the direct LOS path between UE device 10 and BS 34).

When RIS 50 is placed within system 8, BS 34 may transmit wireless signals 46 towards RIS 50 (e.g., within a BS beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards BS 34) and RIS 50 may reflect the wireless signals towards BS 34, as shown by arrow 56.

RIS 50 is an electronic device that includes a two-dimensional surface of engineered material having reconfigurable properties for performing (e.g., reflecting) communications between BS 34 and UE device 10. RIS 50 may include an array of reflective elements such as antenna elements 48 on an underlying substrate. Antenna elements 48 may also sometimes be referred to herein as reflective elements 48, reconfigurable antenna elements 48, reconfigurable reflective elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between BS 34 and UE device 10 around various objects 31 that may be present (e.g., when BS 34 is located outside and UE device 10 is located inside, when BS 34 and UE device 10 are both located inside or outside, etc.).

RIS 50 may be a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed overtime and controlled (e.g., by software running on the RIS or other devices communicably coupled to the RIS such as BS 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of RIS 50.

For example, the control circuitry on RIS 50 may configure antenna elements 48 to reflect wireless signals 46 transmitted by BS 34 towards UE device 10 (as shown by arrow 54) and to reflect wireless signals 46 transmitted by UE device 10 towards BS 34 (as shown by arrow 56). In such an example, control circuitry 36 may configure (e.g., program) a phased antenna array of antennas 44 on BS 34 to form a BS beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of BS 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or BS 34 may be omitted from RIS 50. For example, RIS 50 does not include baseband circuitry (e.g., baseband circuitry 26 or 40) and does not include transceiver circuitry (e.g., transceiver 42 or 28) coupled to antenna elements 48. Antenna elements 48 and RIS 50 therefore do not generate wireless data for transmission, do not synthesize radio-frequency signals for transmission, and do not receive and demodulate radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations. In other implementations, the RIS may include some active circuitry such as circuitry for demodulating received signals using the data RAT (e.g., to perform channel estimates for optimizing its reflection coefficients).

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with BS 34 or UE device 10 (e.g., using a control channel plane and control RAT). Such control signals may be used to coordinate the operation of RIS 50 in conjunction with BS 34 and/or UE device 10 but requires much lower data rates and thus much fewer processing resources and much less power than transmitting or receiving wireless signals 46. These control signals may, for example, be transmitted by UE device 10 and/or BS 34 to configure the phase and magnitude responses of antenna elements 48 (e.g., the control signals may convey beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in an RIS-as-a-service configuration).

In this way, RIS 50 may help to relay wireless signals 46 between BS 34 and UE device 10 when object 31 blocks the LOS path between BS 34 and UE device 10 and/or when the propagation conditions from BS 34 to RIS 50 and from RIS 50 to UE device 10 are otherwise superior to the propagation conditions from BS 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 only includes processing resources and consumes power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 to different reflected signal beams formable by antenna elements 48 (sometimes referred to herein as RIS beams). RIS 50 may configure its own antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-BS beam when the first device is BS 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., BS 34) within the first RIS beam, the antenna elements 48 on RIS 50 may receive the wireless signals incident from the direction the first device (e.g., BS 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., BS 34). In some implementations, RIS 50 may be a transmissive RIS that redirects (e.g., refracts) incident data RAT signals through the plane of the RIS (e.g., according to the impedances of the antenna elements of the RIS) rather than reflecting the signals. RIS's 50 in these configurations may sometimes be referred to herein as transmissive RIS's (e.g., a transmissive RIS may be deployed on a window to refract signals into and/or out of a room through the window).

While referred to herein as "beams," the first RIS beam and the second RIS beams formed by RIS 50 do not include signals/data that are actively transmitted by RIS 50 but instead correspond to the impedance, phase, and/or magnitude response settings (e.g., reflection coefficients) for antenna elements 48 that shape the reflected signal beam of wireless signals 46 from a corresponding incident direction/angle onto a corresponding output direction/angle (e.g., the first RIS beam may be effectively formed using a first set of beamforming coefficients and the second RIS beam may be effectively formed using a second set of beamforming coefficients but are not associated with the active transmission of wireless signals by RIS 50).

Figure 2:
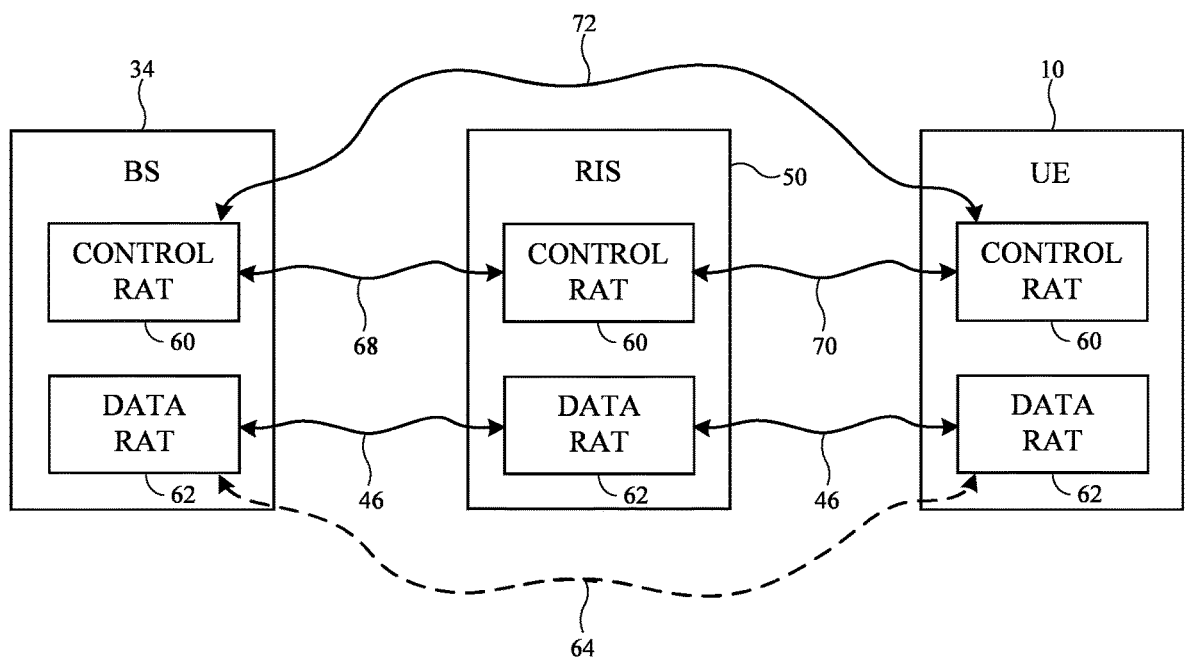
FIG. 2 is a diagram showing how an illustrative wireless base station, RIS, and user equipment device may communicate using both a data transfer radio access technology (RAT) and a control RAT in accordance with some embodiments.

FIG. 2 is a diagram showing how BS 34, RIS 50, and UE device 10 may communicate using both a control RAT and a data transfer RAT for establishing and maintaining communications between BS 34 and UE device 10 via RIS 50. As shown in FIG. 2, BS 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, BS 34, and/or RIS 50).

BS 34 and RIS 50 may use control RAT 60 to convey radio-frequency signals 68 (e.g., control signals) between BS 34 and RIS 50. UE device 10 and RIS 50 may use control RAT 60 to convey radio-frequency signals 70 (e.g., control signals) between UE device 10 and RIS 50. UE device 10, BS 34, and RIS 50 may use data RAT 62 to convey wireless signals 46 via reflection off antenna elements 48 of RIS 50. The wireless signals may be reflected, via the first RIS beam and the second RIS beam formed by RIS 50, between BS 34 and UE device 10. BS 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, BS 34 and UE device 10 may also use control RAT 60 to convey radio-frequency signals 72 directly with each other (e.g., since the control RAT operates at lower frequencies that do not require line-of-sight). UE device 10 and BS 34 may use radio-frequency signals 72 to help establish and maintain THF communications (communications using data RAT 62) between UE device 10 and BS 34 via RIS 50. BS 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between BS 34 and RIS 50 and to convey radio-frequency signals 70 between RIS 50 and UE device 10. If desired, BS 34, RIS 50, and/or UE device 10 may support multiple control RATs 60. In these scenarios, a first control RAT 60 (e.g., Bluetooth) may be used to convey radio-frequency signals 68 between BS 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between BS 34 and UE device 10. Processing procedures (e.g., work responsibilities) may be divided between data RAT 62 one or more control RAT 60 during discovery, initial configuration, data RAT communication between UE device 10 and BS 34 via RIS 50, and beam tracking of UE device 10.

Figure 3:
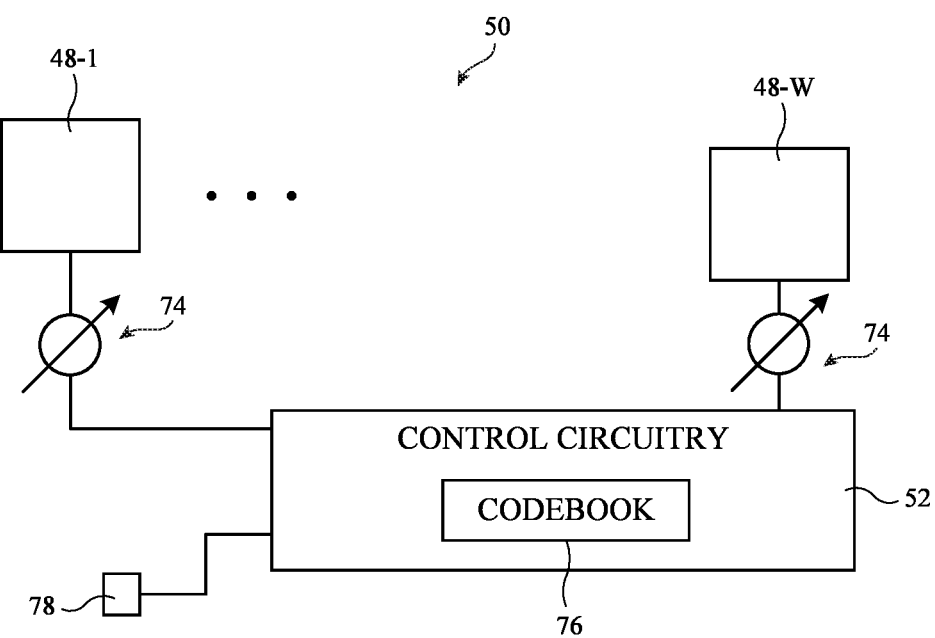
FIG. 3 is a diagram of an illustrative RIS in accordance with some embodiments.

FIG. 3 is a diagram of RIS 50. As shown in FIG. 3, RIS 50 may include a set of W antenna elements 48 (e.g., patches or other structures formed from metal or metamaterials on an underlying substrate). The W antenna elements 48 may be arranged in an array pattern (e.g., having sub-wavelength spacing). The array pattern may have rows and columns.

Other array patterns may be used if desired. Each antenna element W may be coupled to a corresponding adjustable device 74. Adjustable devices 74 may include, as one example, a diode switch. Each adjustable device 74 and its corresponding antenna element 48 may sometimes be referred to herein as a unit cell of RIS 50 (e.g., RIS 50 may have W unit cells).

Control circuitry 52 may provide control signals (e.g., a variable voltage) to adjustable devices 74 that configure each adjustable device 74 to impart a selected impedance to its corresponding antenna element 48. The impedance may effectively impart a corresponding phase shift to incident THF signals that are scattered (e.g., re-radiated or effectively reflected) by the antenna element. Adjustable devices 74 may therefore sometimes be referred to herein as phase shifters 74. Control circuitry 52 may transmit control signals to phase shifters 74 to control each phase shifter 74 to exhibit a corresponding phase setting. Each phase setting may cause the antenna element 48 to impart a corresponding phase shift to the wireless signals 46 scattered (reflected) by the antenna element for data RAT 62. Put differently, each phase setting may configure the corresponding antenna element 48 to exhibit a particular reflection coefficient or impedance for incident signals. By selecting the appropriate settings (phase shift settings or applied phase shifts) for phase shifters 74, the array of antenna elements 48 may be configured to form RIS beams in different directions (e.g., to reflect/scatter wireless signals incident from incident angles associated with a first RIS beam onto corresponding output angles associated with a second RIS beam).

As shown in FIG. 3, RIS 50 may have one or more antennas 78. Antenna(s) 78 may include one or more of the W antenna elements 48 or may be separate from the W antenna elements 48 on RIS 50. Antenna(s) 78 may be coupled to a transceiver on RIS 50 and may be used to convey control signals over control RAT 60. Control circuitry 52 may transmit control signals using antenna(s) 78 and/or may receive control signals using antenna(s) 78.

Control circuitry 52 may store a codebook 76 that maps different sets of settings (e.g., phase settings) for phase shifters 74 to different input/output angles (e.g., to different combinations of first and second RIS beams for RIS 50). Codebook 76 may be populated during manufacture, deployment, calibration, and/or regular operation of RIS 50. If desired, BS 34 (FIG. 1) may use control RAT 60 to update the entries of codebook 76. During operation, RIS 50 may be controlled to configure (program) phase shifters 74 to form the RIS beams necessary for RIS 50 to reflect wireless signals 46 between the location of BS 34 and the location of UE device 10, which may change over time. This may involve selection (calculation) of the appropriate set of phase settings (e.g., imparted phase shifts) for phase shifters 74 to form the RIS beams.

In practice, BS 34 may require internet access, a power connection, implementation of a full WLAN protocol and, in the case of a relay or mesh configuration, transfers may require handling of two links (base station and user links). In many environments, obstacles such as walls or furniture may block a LOS path to the BS. Disposing many BS's within the environment to cover all areas of the environment despite the obstacles can be unnecessarily expensive, can consume an excessive amount of resources, and may not be possible given the power outlets or connectivity available for access points in each of the areas. Further, a single RIS 50 may not be able to provide a single BS with coverage for all areas of the environment. As such, BS 34 may need to use multiple RIS's 50 to be able to communicate with UE devices located in all areas of the environment. If desired, multiple RIS's may be arranged in a relay configuration in which a chain of multiple RIS's serve as a communication link to route (reflect) wireless data between the BS and a UE device.

Figure 4:
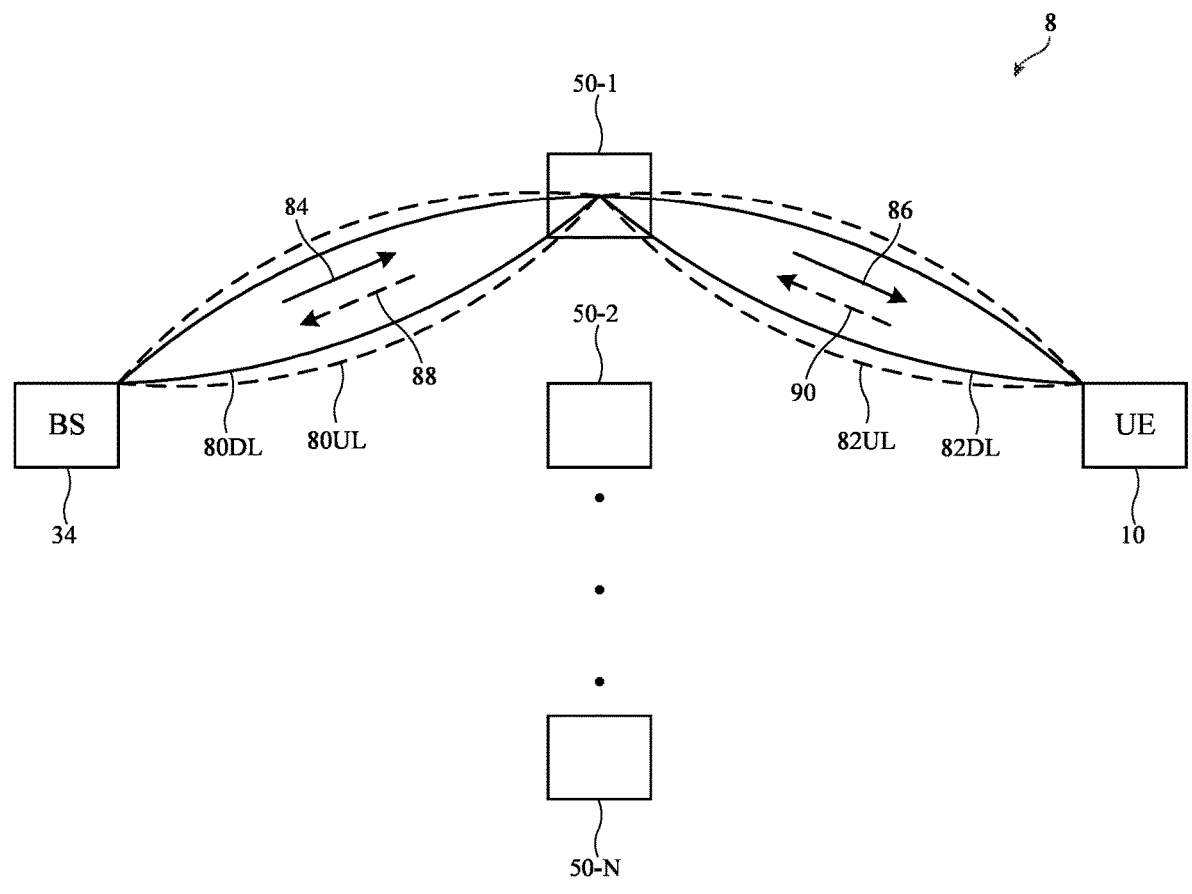
FIG. 4 is a diagram showing how a wireless base station and a user equipment device may communicate using uplink and downlink signal beams directed towards the same RIS in accordance with some embodiments.

FIG. 4 is a diagram showing one example in which system 8 includes multiple RIS's 50 for reflecting wireless signals between BS 34 and at least one UE device 10. As shown in FIG. 4, system 8 may include a set of N spatially-separated RIS's 50 (e.g., a first RIS 50-1, a second RIS 50-2, an Nth RIS 50-N, etc.). N may be any desired integer greater than or equal to two, for example.

When performing wireless communications using data RAT 62 (FIG. 2) and wireless signals 46 (FIG. 1), BS 34 may concurrently form both a first BS beam 80UL and a second BS beam 80DL. BS 34 may receive UL signals over (using) BS beam 80UL. BS beam 80UL may therefore sometimes be referred to herein as BS uplink (UL) beam 80UL or UL BS beam 80UL. BS 34 may transmit DL signals over (using) BS beam 80DL. BS beam 80DL may therefore sometimes be referred to herein as BS downlink (DL) beam 80DL or DL BS beam 80DL. At the same time, UE device 10 may concurrently form both a first UE beam 82UL and a second UE beam 82DL. UE device 10 may transmit UL signals over (using) UE beam 82UL. UE beam 82UL may therefore sometimes be referred to herein as UE uplink (UL) beam 82UL or UL UE beam 82UL. UE device 10 may receive DL signals over (using) UE beam 82DL. UE beam 82DL may therefore sometimes be referred to herein as UE downlink (DL) beam 82DL or DL UE beam 82DL.

In the example of FIG. 4, BS 34 forms both BS beam 80DL and BS beam 80UL in the same beam pointing direction oriented towards RIS 50-1 (e.g., BS beam 80DL may be the same as BS beam 80UL). At the same time, UE device 10 forms both UE beam 82DL and UE beam 82UL in the same beam pointing direction oriented towards RIS 50-1 (e.g., UE beam 82DL may be the same as UE beam 82UL). BS 34 may transmit DL signals in the direction of arrow 84 using BS beam 80DL. RIS 50-1 may reflect the DL signals towards UE device 10. UE device 10 may receive the DL signals reflected by RIS 50-1 from the direction of arrow 86. UE device 10 may transmit UL signals in the direction of arrow 90 using UE beam 82UL. RIS 50-1 may reflect the UL signals towards BS 34. BS 34 may receive the UL signals reflected by RIS 50-1 from the direction of arrow 88. In this way, RIS 50-1 may direct wireless communications data in wireless signals 46 between UE device 10 and BS 34.

In some implementations, the set of all UL and DL BS beams formable by BS 34 may be codebook beams that are specified by entries in the BS codebook stored on BS 34. Similarly, the set of all UL and DL UE beams formable by UE device 10 may be codebook beams that are specified by entries in the UE codebook stored on UE device 10. In other implementations, BS 34 and/or UE device 10 may implement channel-based beam forming for forming the corresponding UL and/or DL beams. Channel-based beam forming involves the active computation of phase and magnitude settings for the antennas based on real-time channel measurements (e.g., using optimal eigenvectors of channel covariance matrices). This may allow beam selection to be more dynamic (with more degrees of freedom) than code-based beamforming and does not limit the set of formable signal beams to those stored in the codebook.

In practice, transmit (TX) beamforming (e.g., DL beamforming at BS 34 or UL beamforming at UE device 10) may need to use codebook beams (e.g., using a synchronization signal block (SSB) beam sweep) that are identified based on a measurement report generated and transmitted by the receiving device. On the other hand, receive (RX) beamforming (e.g., UL beamforming at BS 34 or DL beamforming at UE device 10) can be arbitrary (e.g., without transmission of measurement reports) based on active channel measurements. However, with different types of TX/RX beamforming (e.g., codebook or channel-based beamforming) at any entity (e.g., BS 34, RIS 50, or UE device 10), the optimal RIS 50 to use for reflecting UL signals between BS 34 and UE device 10 may be different from the optimal RIS 50 to use for reflecting DL signals between BS 34 and UE device 10. For example, when a single RIS such as RIS 50-1 is used to reflect both the UL signals and the DL signals, the spatial signal strength pattern of the DL signals reflected by RIS 50-1 will often be very different from the spatial signal strength pattern of the UL signals reflected by RIS 50-1. As such, different channel conditions may be present for the UL signals than for the DL signals, such that using the same RIS 50 to reflect both the UL signals and the DL signals may undesirably limit the overall received signal quality in system 8.

Figure 5:
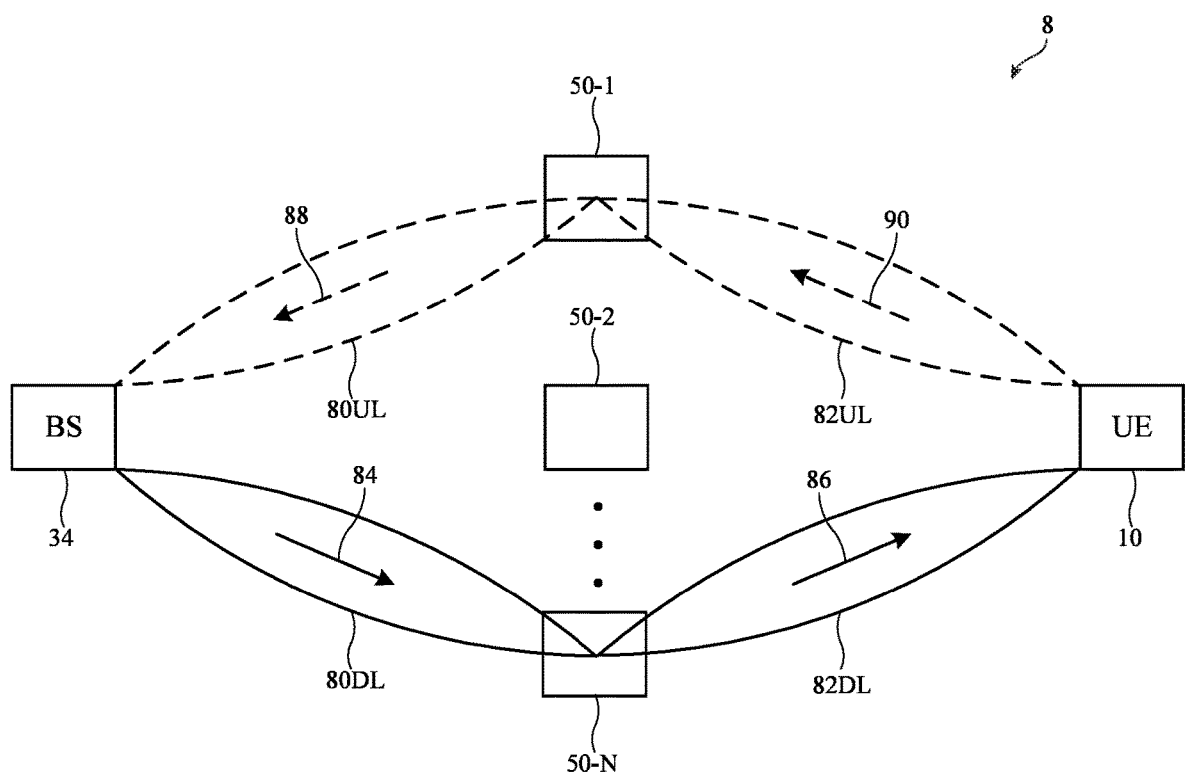
FIG. 5 is a diagram showing how a wireless base station and a user equipment device may communicate using uplink signal beams oriented towards an uplink RIS and using downlink signal beams oriented towards a downlink RIS in accordance with some embodiments.

To mitigate these issues, a different RIS may be used to reflect UL signals than the RIS used to reflect DL signals between BS 34 and UE device 10 (e.g., BS 34 and UE device 10 may break UL/DL beam correspondence). For example, a first RIS 50 (sometimes referred to herein as a DL RIS) may be used to reflect DL signals from BS 34 towards UE device 10 whereas a second RIS 50 (sometimes referred to herein as a UL RIS) is used to concurrently reflect UL signals from UE device 10 towards BS 34. The UL RIS and the DL RIS may be selected in a manner that optimizes the overall received signal quality at both BS 34 and UE device 10 given the current radio-frequency propagation conditions in the system. FIG. 5 is a diagram showing how a UL RIS and a DL RIS may be used to reflect wireless signals 46 (FIG. 1) for data RAT 62 (FIG. 2) between BS 34 and UE device 10.

As shown in FIG. 5, RIS 50-1 may be selected to serve as a UL RIS whereas RIS 50-N is selected to serve as a DL RIS. RIS 50-1 may reflect UL signals from UE device 10 to BS 34 over a corresponding UL data RAT link (e.g., a UL link of data RAT 62). RIS 50-N may reflect DL signals from BS 34 to UE device 10 over a corresponding DL data RAT link (e.g., a DL link of data RAT 62).

To implement the UL data RAT link, UE device 10 may form its uplink UE beam 82UL in a first beam pointing direction oriented towards RIS 50-1. BS 34 may form its uplink BS beam 80UL in a second beam pointing direction oriented towards RIS 50-1. UE device 10 may transmit UL signals over UE beam 82UL (in the direction of arrow 90). RIS 50-1 may reflect the UL signals towards BS 34. BS 34 may receive the UL signals over BS beam 80UL (from the direction of arrow 88).

To implement the DL data RAT link, UE device 10 may form its downlink UE beam 82DL in a third beam pointing direction oriented towards RIS 50-N (e.g., while concurrently forming uplink UE beam 82UL). BS 34 may form its downlink BS beam 80DL in a fourth beam pointing direction oriented towards RIS 50-N (e.g., while concurrently forming uplink BS beam 80UL). BS 34 may transmit DL signals over BS beam 80DL (in the direction of arrow 84). RIS 50-N may reflect the DL signals towards UE device 10. UE device 10 may receive the DL signals over UE beam 82UL (from the direction of arrow 86).

The example of FIG. 5 only illustrates beamforming performed by BS 34 and UE device 10 for the sake of clarity. In practice, RIS 50-1 is also configured (e.g., by BS 34 and/or UE device 10) to form RIS beams oriented towards BS 34 and UE device 10 to implement the UL data RAT link. Similarly, RIS 50-N is also configured (e.g., by BS 34 and/or UE device 10) to form RIS beams oriented towards BS 34 and UE device 10 to implement the DL data RAT link.

The particular RIS configured to serve as the UL RIS and the particular RIS configured to serve as the DL RIS are selected in a manner that optimizes the overall received signal quality (or any other desired wireless performance metric) across BS 34 and UE device 10 given the current propagation conditions in communications system 8. In the example of FIG. 5, configuring RIS 50-1 as the UL RIS and configuring RIS 50-N as the DL RIS may serve to optimize the overall received signal quality between BS 34 and UE device 10 given the current propagation conditions. In practice, whether any given RIS 50 can provide performance gain in the UL or DL direction depends on the geometry and capabilities of each RIS, the relative position of each RIS with respect to BS 34 and UE device 10, the presence of obstacles such as external object 31 (FIG. 1) in the environment, etc.

BS 34 and/or UE device 10 may perform a UL/DL RIS selection procedure to configure a first of the N RIS's 50 in system 8 to serve as the UL RIS and to configure a second of the N RIS's 50 in system 8 to serve as the DL RIS (e.g., in a manner that optimizes performance under the current propagation conditions). As one example, BS 34 and UE device 10 can exhaustively measure received signal strength for every combination of each of the N RIS's, each of the BS DL beams, each of the BS UL beams, each of the UE DL beams, and each of the UE UL beams, and can select the RIS that produced the highest received signal strength for the UL signals as the UL RIS and the RIS that produced the highest received signal strength for the DL signals as the DL RIS. However, such an approach (sometimes referred to herein as exhaustive beam training) involves high overhead and can consume an excessive amount of time as well as excessive power, processing, and communications resources. Re-selection overhead can be particularly high when UE device 10 moves frequently.

Figure 6:
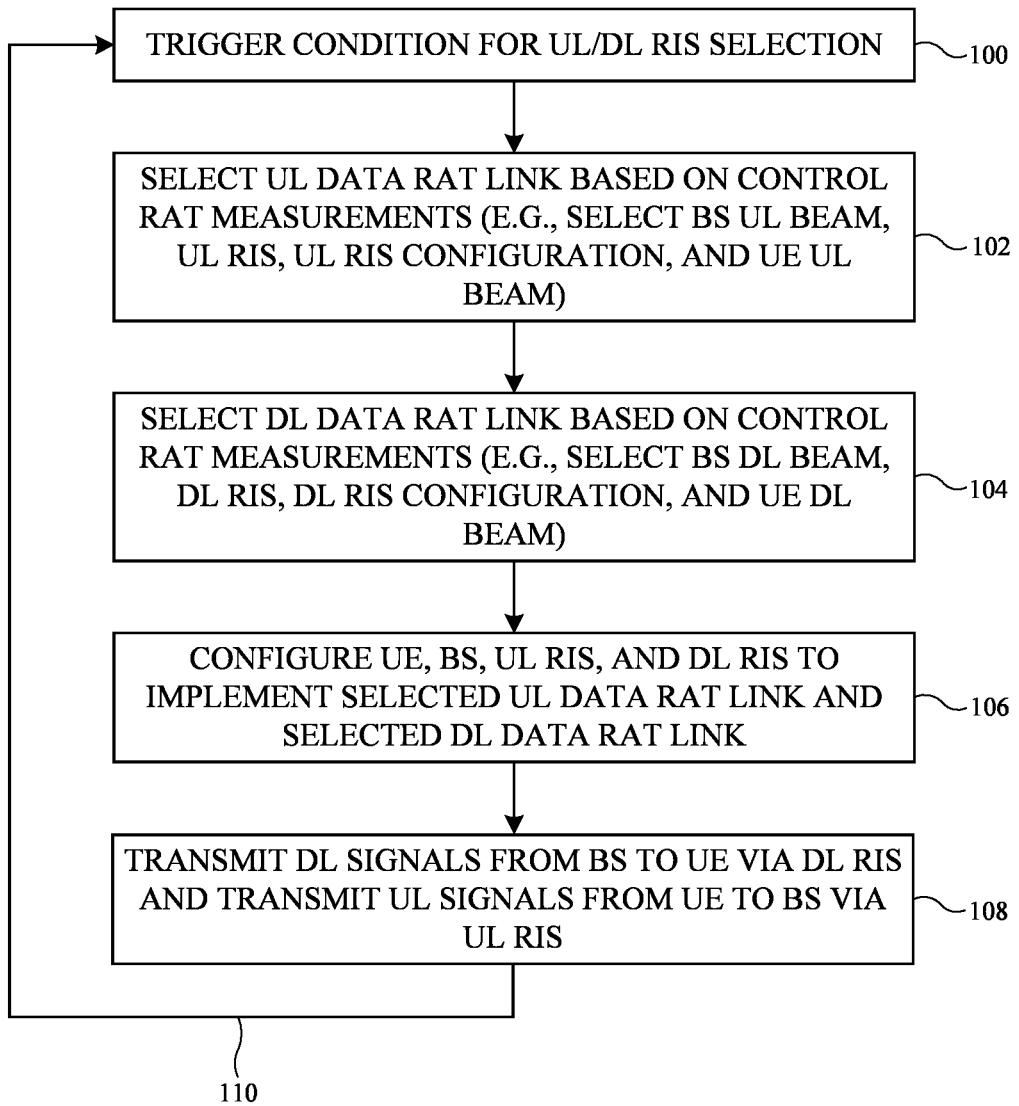
FIG. 6 is a flow chart of illustrative operations involved in performing wireless communications between a wireless base station and a user equipment device via an uplink RIS and a downlink RIS in accordance with some embodiments.

If desired, BS 34 and UE device 10 may use control RAT 60 to select the UL RIS and the DL RIS in a manner that minimizes RIS selection overhead and thus the time, power, communications, and processing resources required to select and configure a UL RIS and a DL RIS for conveying wireless signals 46 between BS 34 and UE device 10. FIG. 6 is a flow chart of illustrative operations that may be performed by system 8 for conveying wireless signals 46 between BS 34 and UE device 10.

At operation 100, a condition may occur that triggers BS 34 and UE device 10 to select a first of the N RIS's 50 in system 8 to serve as an UL RIS for reflecting UL signals and to select a second of the N RIS's 50 in system 8 to serve as a DL RIS for reflecting DL signals (a procedure sometimes referred to herein as RIS selection or RIS re-selection). As examples, such a trigger condition may occur when UE device 10 enters the network or is powered on, when UE device 10 loses its UL or DL connection, when UE device 10 or BS 34 measures a drop in a wireless performance metric (e.g., signal to interference and noise ratio (SINR)) that exceeds a threshold value, when a BS beam or UE beam fails (e.g., due to external object 31 of FIG. 1 blocking the beam), when an already-configured UL RIS loses its connection (in which case the already-configured DL RIS can be temporarily used for reflecting UL signals before RIS re-selection is complete), when an already-configured DL RIS loses its connection (in which case the already-configured UL RIS can be temporarily used for reflecting DL signals before RIS re-selection is complete), when a new RIS 50 has been added to system 8 and recognized by the network, when an existing RIS 50 has been removed from system 8, when UE device 10 changes position or orientation, when the communications capabilities of BS 34, UE device 10, and/or one or more RIS's 50 has been upgraded or downgraded, when a network administrator or system operator has provided an instruction to BS 34 to perform RIS selection or re-selection, etc.

At operation 102 (e.g., in response to the trigger condition), BS 34 and/or UE device 10 may select (e.g., identify, calculate, generate, compute, produce, etc.) a UL data RAT link for conveying UL signals from UE device 10 to BS 34. The UL data RAT link may include a corresponding UL RIS, an uplink BS beam 80UL pointed towards the UL RIS, an uplink UE beam 82UL pointed towards the UL RIS, and a corresponding UL RIS configuration (e.g., phase settings for the antenna elements 48 on the UL RIS that configure the UL RIS to form corresponding RIS beams for implementing the UL data RAT link). BS 34 and/or UE device 10 may select the UL data RAT link based on signals transmitted using control RAT 60 (sometimes referred to herein as control channel 60) and based on signal measurements performed using control RAT 60 (sometimes referred to herein as control RAT measurements). The control channel may be out-of-band (e.g., at lower frequencies than the frequencies of wireless signals 46) or may be in-band (e.g., at the same frequencies as wireless signals 46). The control RAT measurements may, for example, serve to estimate how UL signals for the data RAT would propagate from UE device 10 to BS 34 under the current propagation conditions and can therefore be used to estimate data RAT channel information for the UL signals. Leveraging the control RAT to perform UL data RAT link selection in this way may serve to reduce UL RIS selection overhead relative to performing exhaustive beam training.

At operation 104, which may be performed concurrently with operation 102, BS 34 and/or UE device 10 may select a DL data RAT link for conveying DL signals from BS 34 to UE device 10. The DL data RAT link may include a corresponding DL RIS, a downlink BS beam 80DL pointed towards the DL RIS, a downlink UE beam 82DL pointed towards the DL RIS, and a corresponding DL RIS configuration (e.g., phase settings for the antenna elements on the DL RIS that configure the DL RIS to form corresponding RIS beams for implementing the DL data RAT link). BS 34 and/or UE device 10 may select the DL data RAT link based on signals transmitted using control RAT 60 and based on control RAT measurements. The control RAT measurements may, for example, serve to estimate how DL signals for the data RAT would propagate from BS 34 to UE device 10 under the current propagation conditions and can therefore be used to estimate data RAT channel information for the DL signals. Leveraging the control RAT to perform DL data RAT link selection in this way may serve to reduce DL RIS selection overhead relative to performing exhaustive beam training.

At operation 106, UE device 10, BS 34, the UL RIS, and the DL RIS may be configured to implement the selected UL data RAT link and the selected DL data RAT link. For example, in the case shown in FIG. 5, BS 34 and/or UE device 10 may use control RAT 60 to configure RIS 50-1 to serve as the UL RIS (e.g., by configuring RIS 50-1 to implement the UL RIS configuration). BS 34 and/or UE device 10 may use control RAT 60 to configure RIS 50-N to serve as the DL RIS (e.g., by configuring RIS 50-N to implement the DL RIS configuration). BS 34 may form its uplink BS beam 80UL in a direction oriented towards RIS 50-1 (the UL RIS) and may concurrently form its downlink BS beam 80DL in a direction oriented towards RIS 50-N (the DL RIS). UE device 10 may form its uplink UE beam 82UL in a direction oriented towards RIS 50-1 (the UL RIS) and may concurrently form its downlink UE beam 82DL in a direction oriented towards RIS 50-N (the DL RIS).

At operation 108, BS 34 may transmit DL signals using data RAT 62 towards the DL RIS (e.g., within the corresponding downlink BS beam). The DL RIS may reflect the DL signals towards UE device 10. UE device 10 may receive the reflected DL signals from the DL RIS (e.g., within the corresponding downlink UE beam). UE device 10 may transmit UL signals using data RAT 62 towards the UL RIS (e.g., within the corresponding uplink UE beam). The UL RIS may reflect the UL signals towards BS 34. BS 34 may receive the reflected UL signals from the UL RIS (e.g., within the corresponding uplink BS beam). Processing may subsequently loop back to operation 100 via path 110 to perform additional RIS re-selection procedures as needed.

Figure 7:
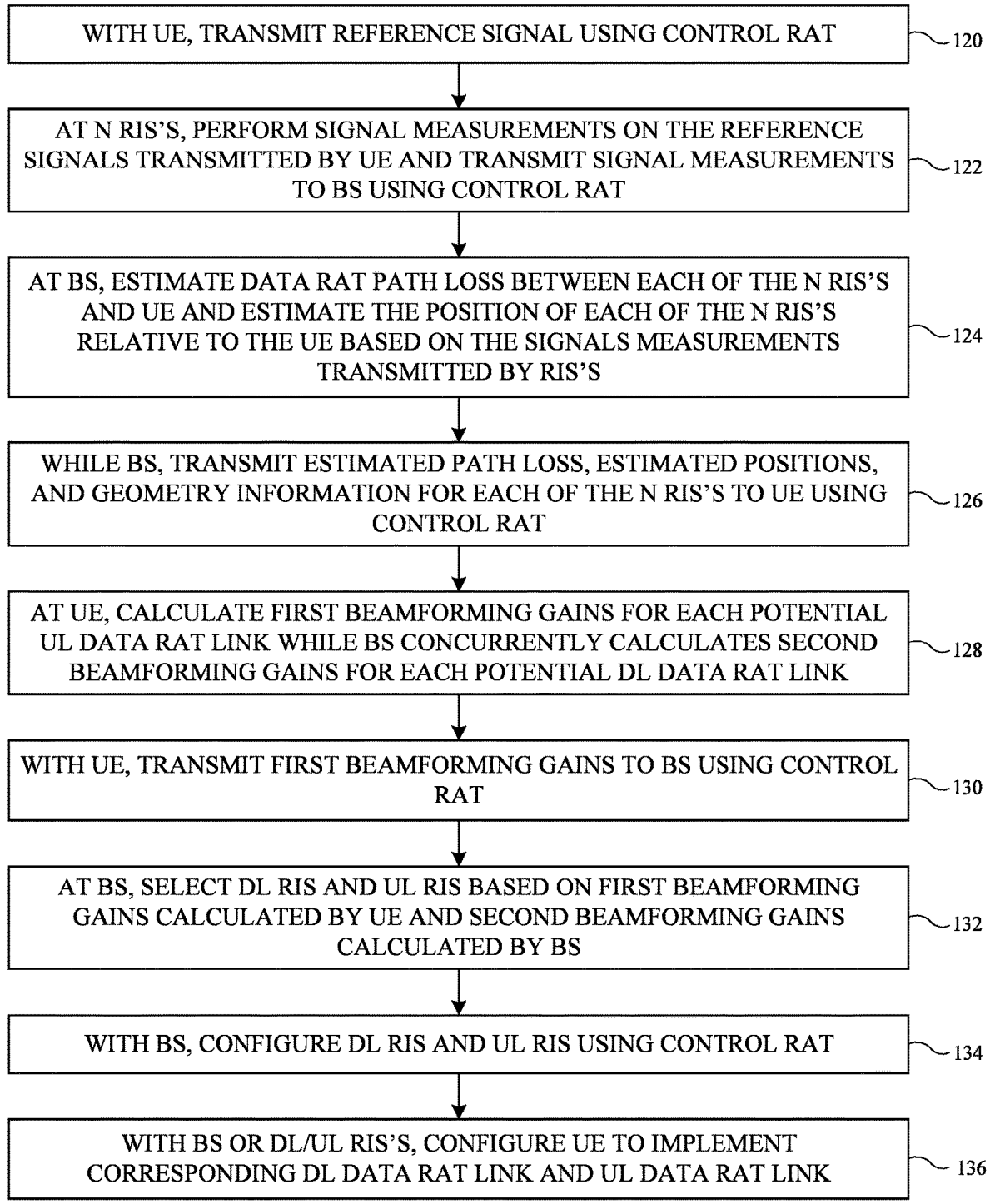
FIG. 7 is a flow chart of illustrative operations that may be performed by a wireless base station and a user equipment device to select an uplink RIS and a downlink RIS for performing wireless communications in accordance with some embodiments.

FIG. 7 is a flow chart of illustrative operations that may be performed by UE device 10 and BS 34 to select a UL RIS and a DL RIS for conveying wireless signals 46 between UE device 10 and BS 34. The operations of FIG. 7 may, for example, be performed during the RIS selection/re-selection procedure of operations 102-106 of FIG. 6. In the example of FIG. 7, system 8 includes N RIS's 50 that are controlled by the network and configured by a corresponding BS 34 (e.g., BS 34 has knowledge of the position, location, orientation, and capabilities of each of the N RIS's 50 and is responsible for programming the RIS's to implement corresponding RIS configurations), UE device 10 is able to communicate with BS 34 before using any selected UL/DL RIS's (either via a direct link or an additional UE-controlled RIS that is transparent to BS 34), and knowledge of the location of UE device 10 is not necessary for BS 34. This example is illustrative and non-limiting.

At operation 120 of FIG. 7, UE device 10 may transmit (e.g., broadcast) a signal using control RAT 60. The signal may be, for example, a reference signal (RS), a pilot signal, a beacon signal, etc. In implementations where control RAT 60 uses relatively high frequencies (e.g., millimeter wave frequencies), UE device 10 may transmit the RS while sweeping over UE beams of the control RAT. The RS may include information identifying the control RAT UE beamforming gain if desired. The broadcasted signal may be received at each of the N RIS's 50 in system 8 (e.g., regardless of whether the RIS's have a LOS to UE device 10).

At operation 122, the antenna(s) 78 on each of the N RIS's 50 in system 8 may receive the signal broadcasted by UE device 10 using control RAT 60. The control circuitry 52 on each of the N RIS's 50 may perform control RAT measurements on the received signal (sometimes referred to herein as control channel measurements). The control RAT measurements may include measurements of any desired wireless performance metrics (e.g., control circuitry 52 may generate reference signal received signal power (RSRP) values, time of arrival values, signal-to-noise ratio (SNR) values, noise values, error rate values, signal quality values, or any other desired measurements based on the signal received using control RAT 60). The control RAT measurements gathered by each of the N RIS's 50 may serve as a proxy or estimate of the propagation conditions between UE device 10 that RIS 50 for data RAT 62 but without the overhead or LOS required to perform direct channel measurements using data RAT 62.

Each of the N RIS's 50 may transmit the control RAT measurements to BS 34 using control RAT 60. The RIS's may transmit the control RAT measurements in measurement reports, for example. If desired, BS 34 may assign frequency and/or time resources of the control RAT to each of the N RIS's 50 to prevent collisions or interference between the transmitted measurement reports (e.g., the control RAT measurements may be reported in a contention-free or a contention-based manner). In implementations where UE device 10 transmits the RS while sweeping over UE beams of the control RAT (e.g., when control RAT 60 uses relatively high frequencies such as millimeter wave frequencies), each RIS 50 may find the peak RSRP during the sweep and may identify corresponding UE control RAT beamforming gain, which may be specified in the RS broadcasted by the UE device. The RIS may report the identified beamforming gain to the BS.

At operation 124, BS 34 may estimate (e.g., generate, calculate, compute, produce, output, derive, etc.) the channel/propagation conditions for data RAT 62 between UE device 10 and each of the N RIS's 50 based on the control RAT measurements received from the RIS's. This may include, for example, estimating the path loss for data RAT 62 between UE device 10 and each of the N RIS's 50 based on the received control RAT measurements and/or estimating the position of each of the N RIS's 50 relative to UE device 10 based on the control RAT measurements. BS 34 may use different channel models to estimate path loss and/or position based on the current environment of system 8 (e.g., based on the current deployment, weather conditions, etc.). The position of the RIS's relative to UE device 10 may include the distances between the RIS's and UE device 10 and/or the direction from the RIS's to UE device 10 (e.g., based on time of arrival (TOA) and/or round trip time (RTT) information in the control RAT measurements, GPS information reported by the UE device, the known location of the RIS's, etc.).

At operation 126, BS 34 may transmit the estimated path loss and/or position of each of the N RIS's 50 to UE device 10 (e.g., over control RAT 60 or data RAT 62 if there is a LOS between BS 34 and UE device 10). BS 34 may also transmit information about the N RIS's 50 to UE device 10. The information about the N RIS's 50 may include identification information (e.g., global identifiers), position information identifying the position and/or orientation of the RIS's, information about the capabilities of the RIS's, geometry information about the size/geometry of each RIS and/or the antenna elements 48 on each RIS, etc.

At operation 128, UE device 10 may calculate (e.g., compute, produce, generate, etc.) first beamforming gains for each potential UL data RAT link (e.g., through each of the N RIS's 50) based on the estimated path loss, the estimated position information, and/or the information about the RIS's as received from BS 34. BS 34 may concurrently calculate second beamforming gains for each potential DL data RAT link (e.g., through each of the N RIS's 50) based on the estimated path loss, the estimated position information, and/or the information about the RIS's. DL and UL beamforming gain is not ideal due to codebook beams. The DL and UL RIS beamforming gains may be affected by partial illumination. The beamforming gains may include contributions from beamforming at the UE device and BS (UE beamforming gains and BS beamforming gains) as well as contributions from beamforming at the RIS's (RIS beamforming gains).

For UE device 10 or BS 34, the theoretical codebook beamforming gain of a phased antenna array may be calculated using the equation 1, for example.

$$\max_{\{\beta_i\}_{i=1}^{V}} \left[ \sum_{i=1}^{V} e^{j\left(\beta_i \frac{2\pi}{\lambda} d_i \sin\theta\right)} \right]^2 - \Delta \quad (1)$$

In equation 1, $d_i$ is the spacing between antenna element i and the antenna element 1, θ is the angle of departure (AoD) to a given RIS, V is the number of array elements, $\beta_1$ is the phase of antenna element I, selected among codebook beams, and Δ is a non-negative value that represents the practical beamforming gain loss caused by imperfections (e.g., misalignment).

For a given RIS 50, the RIS beamforming gain may be calculated as the square of the number of illuminated antenna elements 48 ($M_{ii}^2$). In practice, only a subset of the antenna elements 48 on RIS 50 may be illuminated by a corresponding BS beam or UE beam to provide beamforming gain (e.g., if the RIS is too large or the beam is too narrow). The maximum of $M_{ii}$ in a single dimension is equal to $(2*r*\sin(\omega/2))/(d*\cos(\phi))$, where r is the distance between RIS 50 and the transmitting device (UE device 10 or BS 34), φ is the angle-of-arrival of the transmitted signals incident upon the RIS as measured relative to the normal axis of the RIS, ω is the beam width as transmitted by UE device 10 or BS 34 (in angle space), and d is the spacing between antenna elements 48. $M_{ii}$ is also limited by the total number W of antenna elements 48 on RIS 50 in a single dimension. This equation may be generalized to two-dimensional arrays of antenna elements 48.

At operation 130, UE device 10 may transmit the first beamforming gains to BS 34 (e.g., over control RAT 60 or data RAT 62 if there is a LOS between BS 34 and UE device 10).

At operation 132, BS 34 may select a UL RIS from the N RIS's 50 and may select a DL RIS from the N RIS's 50 based on the first and second beamforming gains and the estimated path losses. For example, BS 34 may estimate the received signal strength for data RAT 62 for UL signals and for DL signals for each of the N RIS's based on the beamforming gains and the estimated path losses. BS 34 may then select the RIS 50 having the highest estimated RSRP (or any other wireless performance metric) for UL signals as the UL RIS and may select the RIS 50 having the highest estimated RSRP (or any other wireless performance metric) for DL signals as the DL RIS. If desired, BS 34 may also account for the presence of multiple UE devices 10 (e.g., under a multi-user MIMO configuration). If desired, BS 34 may select multiple DL RIS's and/or multiple UL RIS's.

Operations 134-136 may be performed while processing operation 106 of FIG. 6. At operation 134, BS 34 may configure the selected DL RIS and the selected UL RIS. For example, BS 34 may use control RAT 60 to configure the selected DL RIS to implement the DL RIS configuration and to configure the selected UL RIS to implement the UL RIS configuration.

At operation 136, BS 34 may configure UE device 10 to implement the selected DL data RAT link and the selected UL data RAT link (e.g., using control RAT 60 or data RAT 62 if there is a LOS between BS 34 and UE device 10). For example, BS 34 may inform UE device 10 of which RIS 50 will serve as the UL RIS and which RIS 50 will serve as the DL RIS. BS 34 may provide information to UE device 10 identifying the position of the selected UL RIS and the selected DL RIS relative to UE device 10, information about the capabilities of the selected UL RIS and the selected DL RIS, etc. In other implementations, the selected UL RIS may configure UE device 10 to implement the selected UL data RAT link and the selected DL RIS may configure UE device 10 to implement the selected DL data RAT link instead of BS 34 (e.g., using control RAT 60).

If desired, BS 34 may schedule control RAT and data RAT time and/or frequency resources to allow for beam training between UE device 10 and the selected UL and DL RIS's. The beam training may allow UE device 10 to select or compute the uplink UE beam 82UL oriented towards the selected UL RIS and the downlink UE beam 82DL oriented towards the selected DL RIS. Since BS 34 already has knowledge of the position of the selected UL and DL RIS's relative to BS 34, BS 34 can form the uplink BS beam 80UL oriented towards the selected UL RIS and the downlink BS beam 80DL oriented towards the selected DL RIS without performing additional beam training. In some situations, the selected DL RIS will be the same as the selected UL RIS (e.g., when the same RIS 50 maximizes UL and DL RSRP). In these situations, BS 34 and UE device 10 may convey UL and DL signals via the same RIS (e.g., as shown in FIG. 4).

If desired, the systems and methods described above in connection with FIGS. 1-7 may be extended to systems 8 having more than one BS 34 that concurrently communicate with one or more UE devices 10 in the same area or in different areas of the environment. In these situations, BS 34 may use time division duplexing (TDD) and/or frequency division duplexing (FDD) mechanisms to handle communications with multiple UE devices 10 (e.g., selecting different routes/communication paths that serve different UE devices in different time slots and/or at different frequencies). Additionally or alternatively, BS 34 may use parallel beam forming (e.g., to concurrently form two or more BS beams for serving two or more different UE devices). The roles of UE device 10 and BS 34 as described in FIGS. 1-7 may be reversed or swapped. If desired, the UL RIS and/or the DL RIS described herein may be replaced with any other desired reflective device (e.g., a reflective device having an array of passive, fixed, or mechanically adjustable reflective panels at different orientations for reflecting incident signals in different directions), a relay or repeater device (e.g., an active device that re-transmits incident signals with boosted power in a desired output direction), an active device that can actively transmit and/or receive wireless data using antenna elements 48 (FIG. 3), etc.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of UE device 10, RIS 50, and/or BS 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or BS 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or BS 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating a first electronic device to communicate with a second electronic device, the method comprising:
   transmitting, using a first radio access technology (RAT), an uplink signal to the second electronic device via reflection off a first reconfigurable intelligent surface RIS);
   receiving, using the first RAT, a downlink signal from the second electronic device via reflection off a second RIS that is different from the first RIS; and
   broadcasting a signal to the first RIS and the second RIS using a second RAT that is different from the first RAT.

2. The method of claim 1, wherein transmitting the uplink signal comprises:
   with a phased antenna array, transmitting the uplink signal using a first signal beam oriented towards the first RIS.

3. The method of claim 2, wherein receiving the downlink signal comprises:
   with the phased antenna array, receiving the downlink signal using a second signal beam oriented towards the second RIS.

4. The method of claim 1, further comprising:
   receiving, from the second electronic device and using the second RAT, information associated with positions of a set of RIS's; and
   transmitting a set of beamforming gains to the second electronic device using the second RAT, the beamforming gains being based on the positions of the set of RIS's.

5. The method of claim 1, wherein the broadcast signal comprises a reference signal (RS).

6. The method of claim 1, wherein the broadcast signal comprises a pilot signal.

7. The method of claim 1, wherein the broadcast signal comprises a beacon signal.

8. The method of claim 1, wherein the broadcast signal comprises information identifying a beamforming gain of the second RAT for the first electronic device.

9. The method of claim 1, wherein receiving the downlink signal comprises receiving the downlink signal concurrent with transmission of the uplink signal.

10. A method of operating a first electronic device to communicate with a second electronic device, the method comprising:
    transmitting, using a first radio access technology (RAT), a downlink signal to the second electronic device via reflection off a first reconfigurable intelligent surface (RIS);

receiving, using the first RAT, an uplink signal from the second electronic device via reflection off a second RIS that is spatially separated from the first RIS; and broadcasting a signal to the first RIS and the second RIS using a second RAT that is different from the first RAT.

11. The method of claim 10, further comprising:

receiving a first measurement of the second RAT from the first RIS; and receiving a second measurement of the second RAT from the second RIS.

12. The method of claim 11, wherein receiving the first measurement comprises receiving the first measurement using the second RAT and receiving the second measurement comprises receiving the second measurement using the second RAT.

13. The method of claim 11, further comprising:

estimating a first position of the first RIS relative to the second electronic device based on the first measurement received from the first RIS;

estimating a second position of the second RIS relative to the second electronic device based on the second measurement received from the second RIS; and transmitting information identifying the first position and the second position to the second electronic device.

14. The method of claim 10, further comprising:

transmitting a first control signal to the first RIS that configures the first RIS to reflect the downlink signal between the second electronic device and the first electronic device; and transmitting a second control signal to the second RIS that configures the second RIS to reflect the uplink signal between the second electronic device and the first electronic device.

15. The method of claim 10, further comprising:

transmitting a control signal to the second electronic device that identifies the first RIS and the second RIS.

16. A method of operating a first electronic device to communicate with a second electronic device, the method comprising:

receiving channel measurements of a first radio access technology (RAT) from a set of reflective devices;

configuring a first subset of the reflective devices to reflect uplink signals between the first electronic device and the second electronic device using a second RAT that is different form the first RAT; and configuring a second subset of the reflective devices to reflect downlink signals between the first electronic device and the second electronic device using the second RAT, the first subset and the second subset of the reflective devices being selected based on the channel measurements received from the set of reflective devices.

17. The method of claim 16, wherein receiving the channel measurements from the set of reflective devices comprises receiving the channel measurements using the first RAT.

18. The method of claim 16, wherein configuring the first subset of the reflective devices comprises configuring the first subset of the reflective devices to reflect the uplink signals from the second electronic device towards the first electronic device.

19. The method of claim 16, further comprising:

receiving beamforming gains from the second electronic device, the first subset and the second subset of the reflective devices being selected based on the beamforming gains received from the second electronic device.

20. The method of claim 16, further comprising:

estimating path losses between the set of reflective devices and the second electronic device based on the channel measurements received from the set of reflective devices, the first subset and the second subset of the reflective devices being selected based on the estimated path losses.

* * * * *